United States Patent
Park et al.

(10) Patent No.: US 10,159,018 B2
(45) Date of Patent: Dec. 18, 2018

(54) DATA PROCESSING METHOD FOR ACCOMMODATING LEGACY NETWORK SERVICE IN 4G OR NEXT GENERATION NETWORK

(71) Applicant: Korea University Research and Business Foundation, Seoul (KR)

(72) Inventors: Jinwoo Park, Seoul (KR); Yeun-Woong Kyung, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 161 days.

(21) Appl. No.: 15/241,494

(22) Filed: Aug. 19, 2016

(65) Prior Publication Data
US 2017/0055183 A1 Feb. 23, 2017

(30) Foreign Application Priority Data

Aug. 21, 2015 (KR) .................. 10-2015-0118091
Nov. 6, 2015 (KR) .................. 10-2015-0155902

(51) Int. Cl.
*H04W 36/00* (2009.01)
*H04L 29/12* (2006.01)
(Continued)

(52) U.S. Cl.
CPC ..... *H04W 36/0033* (2013.01); *H04L 61/2015* (2013.01); *H04W 8/06* (2013.01);
(Continued)

(58) Field of Classification Search
None
See application file for complete search history.

(56) References Cited

U.S. PATENT DOCUMENTS

| 9,571,384 B2 * | 2/2017 | Wu | .................. H04L 45/302 |
| 2013/0329601 A1 * | 12/2013 | Yin | .................. H04L 45/02 370/254 |
| 2016/0127181 A1 * | 5/2016 | Li | .................. H04L 41/0806 370/254 |

FOREIGN PATENT DOCUMENTS

| KR | 100151914 B1 | 11/1998 |
| KR | 1020120111905 A1 | 10/2012 |

(Continued)

OTHER PUBLICATIONS

Kyung et al., "Software Defined Service Migration through Legacy Service Integration into 4G Networks and Future Evolutions," IEEE COmmunications Magazine (Sep. 2015); 53(9): 1 page.

*Primary Examiner* — Anh Ngoc M Nguyen
(74) *Attorney, Agent, or Firm* — Fox Rothschild LLP (57) ABSTRACT

The present disclosure includes: a data processing method of a software defined network (SDN) controller included in a SDN, wherein the SDN controller is connected to legacy network access equipment, an edge switch, and base network access equipment, and includes: (a) receiving an access request of user equipment transmitted by the legacy network access equipment through the edge switch connected to the legacy network access equipment; (b) setting initial access of the user equipment through a legacy network service module included in the SDN controller in response to the access request of the user equipment; (c) generating an access path for a base network on the basis of a base network service module included in the SDN controller upon completion of the initial access setup; and (d) requesting the edge switch to generate an entry for the access path upon generation of the access path.

6 Claims, 5 Drawing Sheets

(51) Int. Cl.
    *H04W 88/18* (2009.01)
    *H04W 8/06* (2009.01)
    *H04W 24/02* (2009.01)
    *H04W 60/00* (2009.01)

(52) U.S. Cl.
    CPC ............ *H04W 24/02* (2013.01); *H04W 60/00* (2013.01); *H04W 88/18* (2013.01)

(56)     References Cited

FOREIGN PATENT DOCUMENTS

KR    1020150013978 A1    2/2015
    KR    1020150055795 A1    5/2015
    KR       101527786 B1     6/2015

* cited by examiner

DATA PROCESSING METHOD FOR ACCOMMODATING LEGACY NETWORK SERVICE IN 4G OR NEXT GENERATION NETWORK

CROSS-REFERENCE TO RELATED APPLICATION

This application claims the benefit under 35 USC 119(a) of Korean Patent Application No. 10-2015-0118091 filed on Aug. 21, 2015 and Korean Patent Application No. 10-2015-0155902 filed on Nov. 6, 2015 in the Korean Intellectual Property Office, the entire disclosures of which are incorporated herein by reference for all purposes.

TECHNICAL FIELD

The present disclosure relates to a data processing method for integrating and operating existing legacy network services in a 4G network or its next generation network to be developed on the basis of software defined networking (SDN).

BACKGROUND

Among the existing mobile communication network services, 3G and 4G mobile communication services are being provided by separate networks, respectively. Further, recently, a 5G mobile communication network has been under development as a next generation mobile communication network. In addition, Wi-Fi and various near field communication services which used to be separately installed and operated have been provided as integrated services by interworking a mobile communication network with a next generation mobile communication network.

However, even if such technology and service providing methods are developed, network operators should continuously provide mobile communication services which have been provided in the past. For example, network operators should maintain and operate a 3G mobile communication networks to continuously provide services to existing 3G mobile communication service users even at the time when they mainly operate a 4G (also referred to as LTE) mobile communication networks for providing 4G mobile communication services. Furthermore, the network operators should try to improve service quality of the previous generation networks because of business competition between network operators.

In this situation, the network operator's burden of operation and management costs for the respective networks in operation for maintenance, repair, expansion, and quality improvement can be greatly increased. It can be worsen when the network operators try to adopt 5G or next generation mobile communication networks in their business because they may have to operate and manage multiple networks simultaneously.

In order to solve such a problem, a method of integrating services by interworking between heterogeneous wireless communication network apparatuses may be considered. However, it should be noticed that each hardware apparatus and functions for each wireless communication network should be manufactured in compliance with the domestic and foreign standards, so that the method of integrating network services by interworking between hardware apparatuses is very complicated and costly. Further, since each wireless communication network apparatus and function has kept individually developing, it should be getting more difficult to integrate networks and services on the premise of hardware apparatuses.

Particularly note that, in terms of physical performance of hardware apparatuses in a mobile communication network, the performance of a 4G network apparatus is generally superior to the performance of a 3G network apparatus in order to provide improved and new additional services. Further, such trend may be maintained so that a 5G or future network apparatus will have a much higher performance than its past generation 4G or 3G network apparatus. Thus, an efficient method for accommodating physical performances and service performances of the past generation networks as it is in the next generation network, avoiding to maintain the networks separately.

Recently, a software-defined networking (SDN)-based network architecture has been suggested to overcome the limitations exposed in the evolution and advancement of networks on the premise of hardware apparatuses. The SDN divides a network function into a control plane and a transmission plane in terms of software. Further, the SDN converts physical network elements positioned on the transmission plane into software virtual elements and controls and operates the virtual elements using a controller positioned on the control plane.

Further, network function virtualization (NFV) suggested together with the SDN is a technology of virtualizing functional elements of a network apparatus. The NFV technology defines an apparatus and its inherent function as software objects and controls these objects and thus makes it possible to control and operate each function through software.

As described above, recently, various next-generation network architectures using the software-based SDN and NFV have been suggested. However, such network architectures exclude consideration of interworking and integration of the past-generation network apparatuses being operated and the functions thereof.

SUMMARY

In view of the foregoing, the present disclosure concerns a data processing method in a SDN-based network by which a currently-operating 4G network or its next generation network can accommodate legacy network services in a software manner.

However, problems to be solved by the present disclosure are not limited to the above-described problems. There may be other problems to be solved by the present disclosure.

As a technical means for solving the above-described problem, in accordance with a first exemplary solution, there is provided a data processing method of a software defined network (SDN) controller included in a SDN, wherein the SDN controller is connected to legacy network access equipment, an edge switch, and base network access equipment. And the method includes: (a) receiving an access request of user equipment transmitted by the legacy network access equipment through the edge switch connected to the legacy network access equipment; (b) setting initial access of the user equipment through legacy network service modules included in the SDN controller in response to the access request of the user equipment; (c) generating an access path for a base network on the basis of a base network service module included in the SDN controller upon completion of the initial access setup; and (d) requesting the edge switch to generate an entry for the access path upon generation of the access path.

Further, in accordance with a second exemplary scenario, there is provided a data processing method of an edge switch included in a SDN, wherein the edge switch is connected between legacy network access equipment and a base network. And the method includes: (a) receiving an access request of user equipment from the legacy network access equipment; (b) transmitting the access request of the user equipment to the SDN controller connected to the edge switch; (c) receiving an entry generation request including information about an access path generated by the SDN controller in response to the access request of the user equipment; (d) generating an entry in response to the entry generation request; and (e) converting data transmitted from the legacy network access equipment and then transmitting the data to the base network equipment depend on the generated entry information.

Further, in accordance with a third exemplary solution, there is provided a handover method of a SDN controller included in a SDN, wherein the SDN controller is connected to legacy network access equipment, an edge switch, and base network access equipment. And the method includes: (a) receiving a handover request for user equipment connected to the base network access equipment through the edge switch connected to the base network access equipment; (b) transferring the handover request for generation of a data transmission tunnel corresponding to the handover request to the base network access equipment through a base network service module included in the SDN controller; (c) requesting generation of an entry including information about an access path to buffer downlink data transferred to the user equipment during the handover corresponding to the data transmission tunnel to the edge switch; (d) transferring a handover command for the user equipment to the base network access equipment through the base network service module included in the SDN controller; (e) requesting the edge switch to generate an entry including information about an access path after handover to connect the user equipment to the legacy network access equipment through a legacy network service module included in the SDN controller upon completion of the handover for the user equipment; and (f) requesting the base network access equipment to release a resource before handover for the user equipment, and the handover request for the user equipment is transmitted by the base network access equipment, the handover is to change an access path for connecting the user equipment to the base network access equipment to an access path for connecting the user equipment to the legacy network access equipment, the data transmission tunnel is generated to buffer downlink data transferred to the user equipment during the handover, and the base network access equipment and the legacy network access equipment are connected through the edge switch.

According to any one of the above-described exemplary solutions of the present disclosure, it is possible to accommodate legacy network services installed in the past and being operated in a currently-operating 4G or its next generation network in a software manner and thus operate them in one integrated network. Therefore, according to the present disclosure, costs for operating and managing a legacy network which has been used for providing the legacy network services can be reduced.

BRIEF DESCRIPTION OF THE DRAWINGS

In the detailed description that follows, solutions are described as illustrations only since various changes and modifications will become apparent to those skilled in the art from the following detailed description. The use of the same reference numbers in different figures indicates similar or identical items.

DETAILED DESCRIPTION

Hereinafter, embodiments of the present disclosure will be described in detail with reference to the accompanying drawings so that the present disclosure may be readily implemented by those skilled in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element. Further, it is to be understood that the term "comprises or includes" and/or "comprising or including" used in the document means that one or more other components, steps, operation and/or existence or addition of elements are not excluded in addition to the described components, steps, operation and/or elements unless context dictates otherwise and is not intended to preclude the possibility that one or more other features, numbers, steps, operations, components, parts, or combinations thereof may exist or may be added.

In the present specification, some of operations or functions described as being performed by a device or equipment may be performed by a server connected to the device or equipment. Likewise, some of operations or functions described as being performed by a server may be performed by a device or equipment connected to the server.

In the present specification, a legacy network refers to various existing wireless communication networks such as a 3G mobile communication network or Wi-Fi. A base network refers to a 4G mobile communication network or its next generation mobile communication network as a network beyond the legacy network.

The following exemplary solutions are provided only for understanding of the present disclosure but not intended to limit the right scope of the present disclosure. Therefore, the solutions that perform the same functions in the same scope as the present disclosure are also included in the right scope of the present disclosure.

Figure 1:
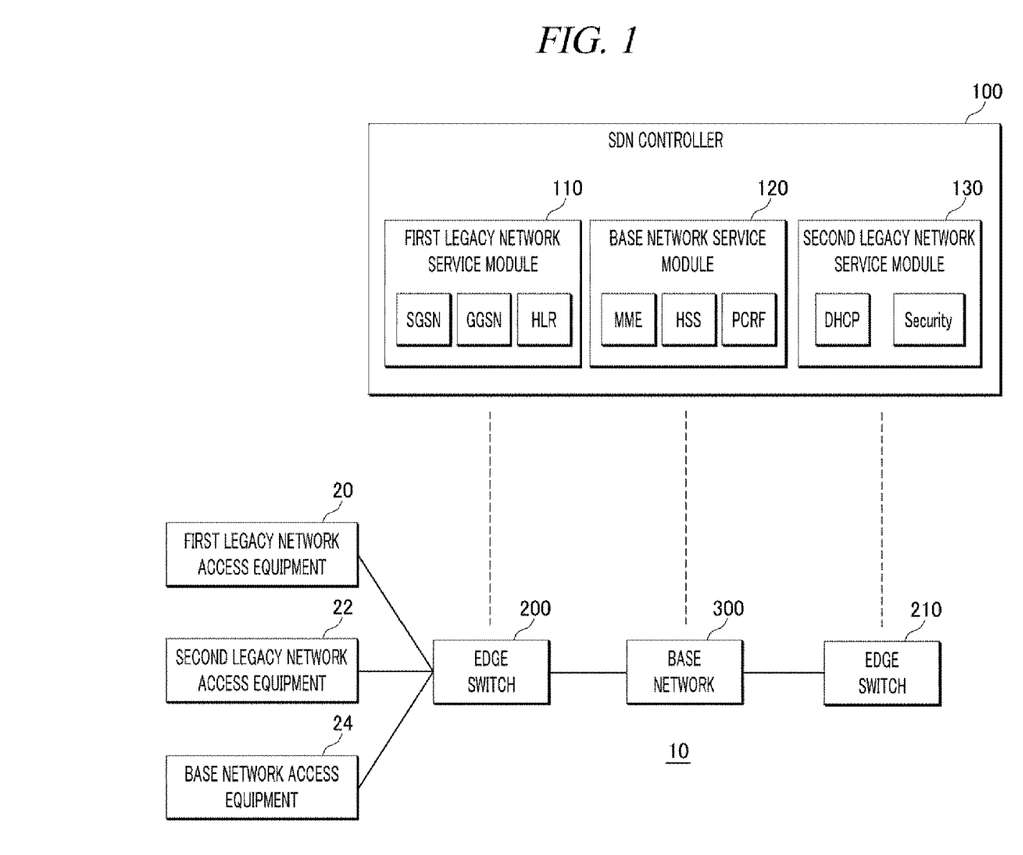
FIG. 1 is a diagram illustrating a network system.

FIG. 1 is a diagram illustrating a network system.

A network system 10 includes legacy network access equipment 20 and 22, base network access equipment 24, a SDN controller 100, multiple edge switches 200 and 210, and a base network 300.

First legacy network access equipment 20 is a 3G network access equipment which may include a NodeB base station in charge of physical wireless access to a mobile device and a radio network controller (RNC).

Second legacy network access equipment 22 is Wi-Fi wireless access equipment such as an access point (AP) to be connected to the mobile device.

The base network access equipment 24 is a 4G network access equipment such as an eNodeB base station in charge of physical wireless access to the mobile device. Depend on the future development of a next generation network, network access equipment corresponding thereto may operate as the base network access equipment 24.

The SDN controller 100 is connected to the edge switches 200 and 210 and the base network 300 to enable user equipment connected through legacy network access equipment to perform data communication through the base network. To this end, the SDN controller 100 includes multiple legacy network service modules 110 and 130 and a base network service module 120 virtualized by software or the like.

For example, a first legacy network service module 110 may be a module for a 3G mobile communication network and may include modules such as a virtualized packet switch support node (SGSN: serving GPRS support node), a virtualized packet gateway support node (GGSN: gateway GPRS support node), and a virtualized home location register (HLR). Further, a second legacy network service module 130 may be a module for a Wi-Fi network and may include a virtualized dynamic host configuration protocol (DHCP) server and a virtualized security module.

Further, the base network service module 120 may include a virtualized mobility management entity (MME), a virtualized home subscriber server (HSS), and a virtualized policy charging and rule function (PCRF). The base network service module 120 is a module used for a 4G mobile communication network. Depend on the future introduction of a next generation mobile communication network, detail components included in the base network service module 120 may be changed. In this case, in order to minimize modification of a currently-operating 4G mobile communication network, it is assumed that the control parts of SGW and PGW closely combined with hardware and network infrastructures are present as being combined with the hardware and network infrastructures as they are.

The edge switch 200 is combined between the network access equipment 20, 22, and 24 and the base network 300. The edge switch 200 functions as an interface for data transmission between a legacy network and the base network 300.

For example, the edge switch 200 functions to convert a format of a header of data transmitted from the legacy network access equipment into a format of a header of data of the base network. Or, the edge switch 200 functions to convert a format of a header of data of the base network into a format of a header of data transmitted from the legacy network access equipment. Further, the edge switch 200 is connected to the SDN controller 100 to enable user equipment connected through the legacy network access equipment to perform data communication through the base network. The operation of the edge switch 200 will be described later in detail.

Figure 2:
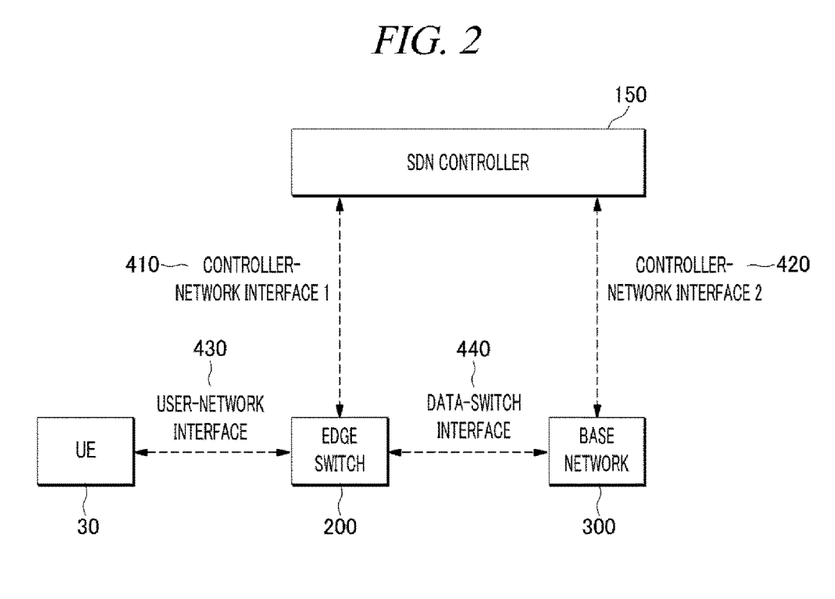
FIG. 2 is a diagram provided to explain a configuration of a SDN controller and an edge switch.

FIG. 2 is a diagram provided to explain a configuration of a SDN controller and an edge switch.

A control plane is managed by the SDN controller 100. In this case, unlike a conventional architecture in which conventional control plane and transmission plane are combined closely, the SDN controller 100 manages the control plate separate from a transmission plane. To this end, the SDN controller 100 includes various network service modules virtualized by software as described above.

Data communication is performed between user equipment 30 and the edge switch 200 through a user network interface 430. In this case, the user network interface 430 refers to a protocol stack defined in a network to which the user equipment 30 is connected. For example, the user network interface 430 may be a 3G mobile communication interface, a Wi-Fi network interface, or a 4G mobile communication interface.

Data communication is performed between the edge switch 200 and a control plane 150 of the SDN controller 100 through a first controller network interface 410. For example, the first controller network interface 410 may be an openflow interface, but is not limited thereto.

Depend on the openflow interface, the SDN controller 100 transmits a command to the edge switch 200. The edge switch 200 performs a process such a transmission, modification, or discarding of a packet in response to the command from the SDN controller 100. Particularly, the SDN controller 100 generates a path for transmitting the packet.

In this case, path information generated by the SDN controller 100 is transferred to the edge switch 200 and then stored in a flow table. The edge switch 200 checks the flow table whenever receiving a packet, and transmits a packet depend on the path information stored in the flow table. Multiple flow entries are stored in the flow table. Each flow entry includes match field information indicative of conditions for packet transmission, action information related to a packet process, and counter. The configuration of the openflow interface has been conventionally known in the art. Thus, detailed description thereof will be omitted.

Data communication is performed between the base network 300 and the control plane 150 of the SDN controller 100 through a second controller network interface 420.

For example, if the base network is a 4G network, the SDN controller 100 controls a serving gateway (SGW) or a PDN gateway (PGW) included in the base network through the base network service module 120. In this case, the second controller network interface 420 may include interfaces, such as Gx and S11, controlling the SGW or the PGW. Meanwhile, if the base network is a next generation network, an interface suitable for the corresponding network may be used.

Data communication is performed between the edge switch 200 and the base network 300 through a data switch interface 440. The edge switch 200 transmits a packet transmitted from the user equipment 30 to the base network through the data switch interface 440. The base network is a 4G network or its next generation network. Thus, a network interface corresponding thereto is used as the data switch interface 440.

Figure 3:
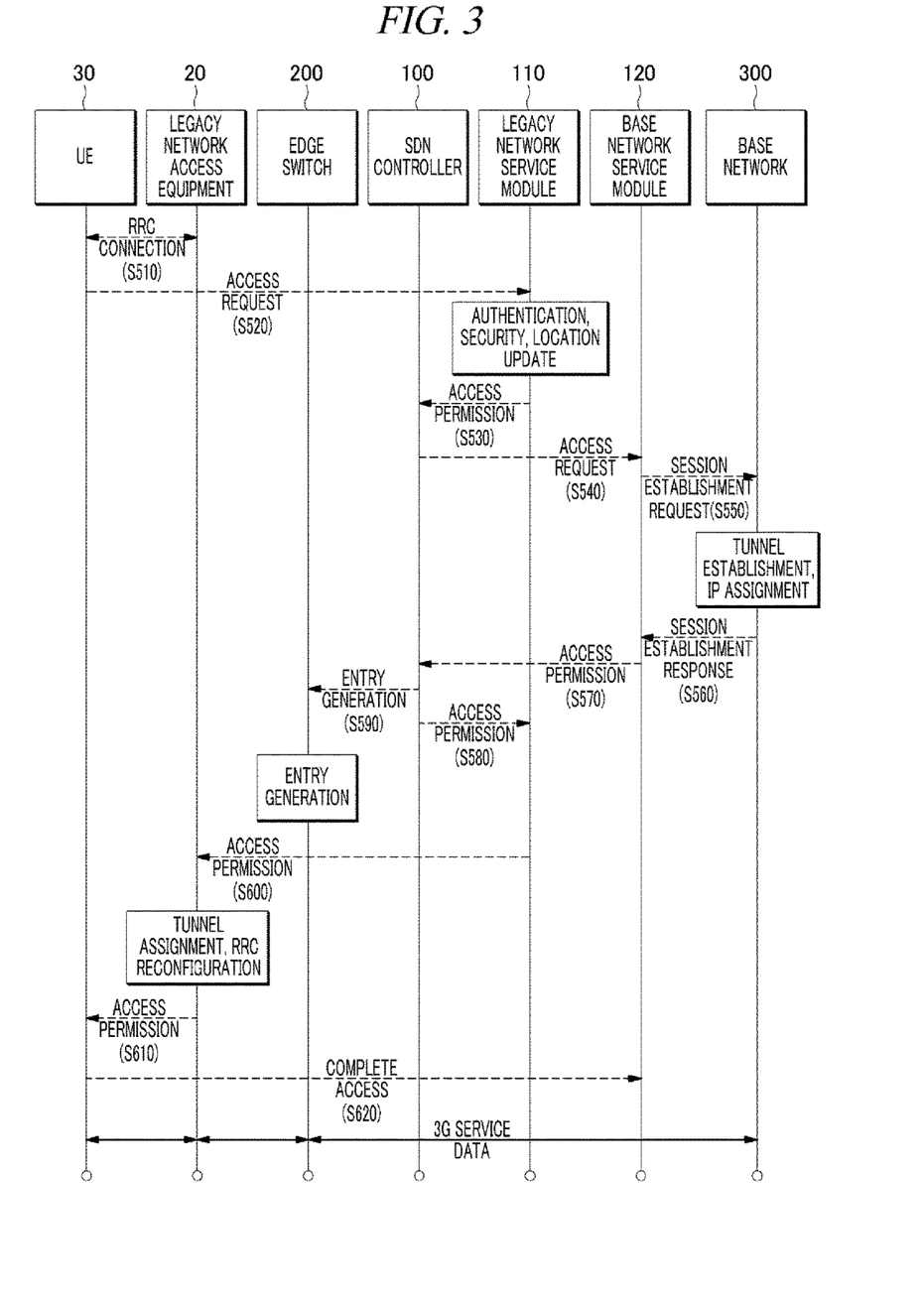
FIG. 3 is a flowchart provided to explain a data processing method for an initial access request in a network system.

FIG. 3 is a flowchart provided to explain a data processing method for an initial access request in a network system.

Firstly, the user equipment 30 is assigned with a network resource from the legacy network access equipment 20 through radio resource control (RRC) in response to a network access request of the user equipment 30 (S510).

Then, the user equipment 30 transfers an access request message to the edge switch 200 (S520). The edge switch 200 searches the flow table on the basis of the inputted access request message, and if there is no flow entry corresponding thereto, the edge switch 200 transmits the access request message to the SDN controller 100. If there is a corresponding flow entry in the flow table, the edge switch 200 transmits a packet depend on information prescribed in the flow entry.

The SDN controller 100 receives the access request message and sets initial access of the user equipment 30 through the legacy network service module 110 included in the SDN controller 100. That is, the legacy network service module 110 performs a user authentication process, a security setup process, and a user location information update process through virtualized SGSN, GGSN, HLR, etc.

When the user authentication process, the security setup process, and the user location information update process are completed, the SDN controller 100 receives a user access permission message from the legacy network service module 110 (S530).

Upon receipt of the access permission message, the SDN controller 100 generates an access path for the base network on the basis of the base network service module 120 included in the SDN controller 100. To this end, the SDN controller 100 transmits the access request from the user equipment to the base network service module 120 (S540). For example, if the base network is a 4G network, the SDN controller 100 transmits the access request message to virtualized MME, HSS, PCRF, etc.

Then, the base network service module 120 requests the base network to establish a session in response to the access request (S550).

For example, if the base network is a 4G network, the base network service module 120 determines a Quality of Service (QoS) for transmitting service data corresponding to the access request, and requests the base network to establish a bearer capable of proving the determined QoS. That is, the base network service module 120 transmits a session establishment message to the SGW or the PGW constituting the base network. The SGW or the PGW receiving the session establishment message establishes a bearer reflecting the previously determined QoS and assigns an IP address and a GPRS Tunneling Protocol (GTP) tunnel for a session that transmits the bearer. Further, the SGW or the PGW transmits the IP address and GTP tunnel information for the session to the base network service module 120 in response to the session establishment request (S560).

For reference, the SGW is included in an evolved packet core (EPC) for the 4G network. If the user equipment moves on an eNodeB, the SGW supports mobility. Further, the PGW is included in the EPC for the 4G network and serves as a node connected to a packet switching network, such as the Internet, in the EPC.

If the base network service module 120 receives a session establishment response (S560), the base network service module 120 transmits the access permission message to the SDN controller 100 (S570).

Further, the SDN controller 100 transmits an entry generation message to request generation of an entry for the session to the edge switch 200 (S590). Then, the edge switch 200 generates an entry including the IP address and GTP tunnel information for the session and then stores the entry in the flow table.

Further, if the base network service module 120 receives a session establishment response (S560), the SDN controller 100 transmits the access permission message to the legacy network service module 110 (S580). Then, the legacy network service module 110 transmits the access permission message to the legacy network access equipment 20 and 22 through the SDN controller 100 and the edge switch 200 (S600).

The legacy network access equipment 20 and 22 receiving the access permission message may assign a tunnel for access to the user equipment 30. If necessary, the legacy network access equipment 20 and 22 may perform a RRC reconfiguration process. After completing the RRC reconfiguration process, the legacy network access equipment 20 and 22 transmit the access permission message to the user equipment 30.

The user equipment 30 transmits an access complete message to the base network service module 120 through the edge switch 200 and the SDN controller 100 (S620).

After the access is completed, the user equipment 30 may perform data communication through the user network interface between the edge switch 200 and the user equipment 30 and the data switch interface between the edge switch 200 and the base network 300.

Figure 4:
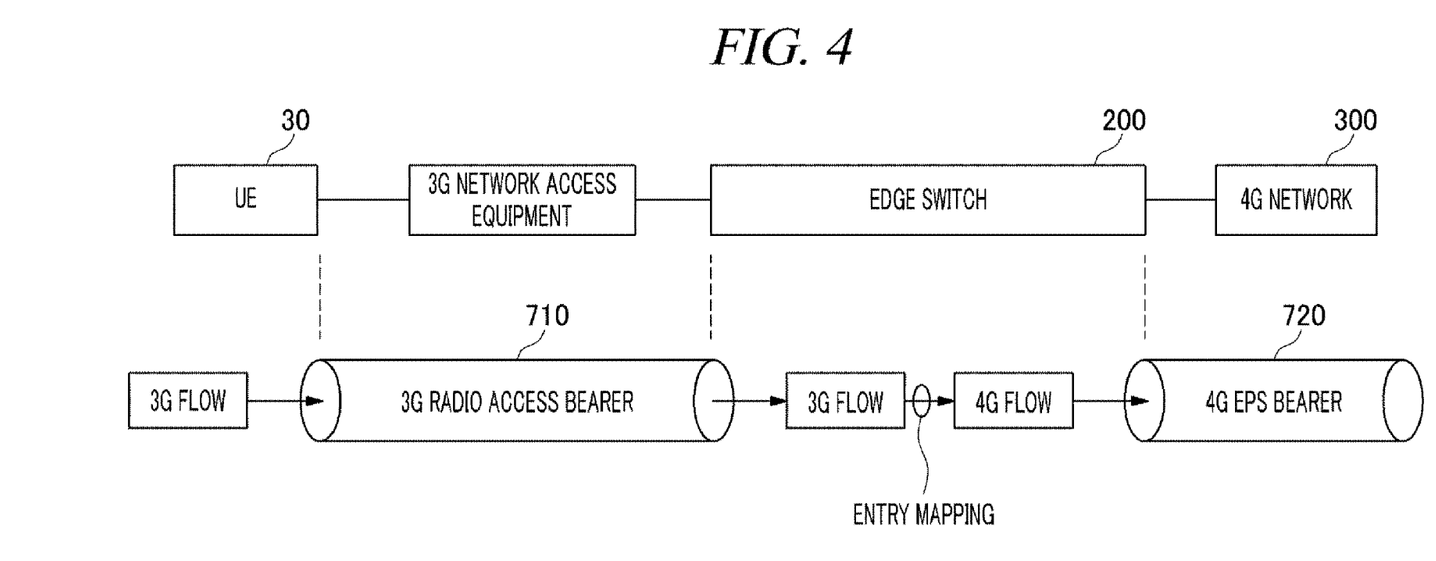
FIG. 4 is a diagram provided to explain an end-to-end data processing method.

FIG. 4 is a diagram provided to explain an end-to-end data processing method.

If the communication setup between the user equipment 30 and the base network 300 is completed by the process described with reference to FIG. 3, a radio access bearer 710 is established between the user equipment 30 and the edge switch 200. In this case, the radio access bearer is assigned with QoS parameters defined in a 3G network. Further, an evolved packet system (EPS) bearer 720 assigned with QoS parameters defined in a 4G network is established between the edge switch 200 and a core network or SGW/PGW of the base network 300.

Accordingly, end-to-end data communication may be performed depend on QoS defined in each network service. During data transmission, the radio access bearer may be managed through the legacy network access equipment 20 and 22 and the edge switch 200 under control of the SDN controller 100. Further, during data transmission, the EPS bearer may be managed by communication between the base network 300 and the base network service module 120.

Meanwhile, the edge switch 200 may convert data transmitted from the legacy network access equipment 20 and 22 and then transmit the data to the base network 300. Or the edge switch 200 may convert data transmitted from the base network 300 and then transmit the data to the legacy network access equipment 20 and 22.

In this case, the edge switch 200 stores a flow entry for processing data transmitted through the legacy network and a flow entry for processing data transmitted through the base network. For example, a flow entry for a 4G or 3G network may include GTP header, user datagram protocol (UDP) header, and Internet protocol (IP) header fields, and a flow entry for a Wi-Fi network may include UDP, TCP, and IP header fields.

Therefore, the edge switch 200 may perform mapping to different flow entries in a case where it is necessary to transmit data, which are received through the legacy network, through the base network and a case where it is necessary to transmit data, which are received through the base network, through the legacy network, respectively, depending on input data.

As such, if it is necessary to transmit data, which are received through the legacy network access equipment, through the base network, the edge switch 200 may use a method of translating a format of a header of the data transmitted from the legacy network access equipment 20 and 22 into a format of a header of data of the base network 300 as an entry matching or data conversion method.

Otherwise, the edge switch 200 may use a method of encapsulating a header of data of the base network 300 on a header of data transmitted from the legacy network access equipment 20 and 22 as an entry matching or data conversion method. On the contrary, if it is necessary to transmit data received through the base network to the legacy network access equipment, the edge switch 200 may use a method of translating a format of a header of data transmitted from the base network 300 into a format of a header of data of the legacy network or a method of decapsulating a header of data of the base network 300 as an entry matching or data conversion method.

Then, a handover between heterogeneous access equipment in a network system will be described with reference to FIG. 5.

Figure 5:
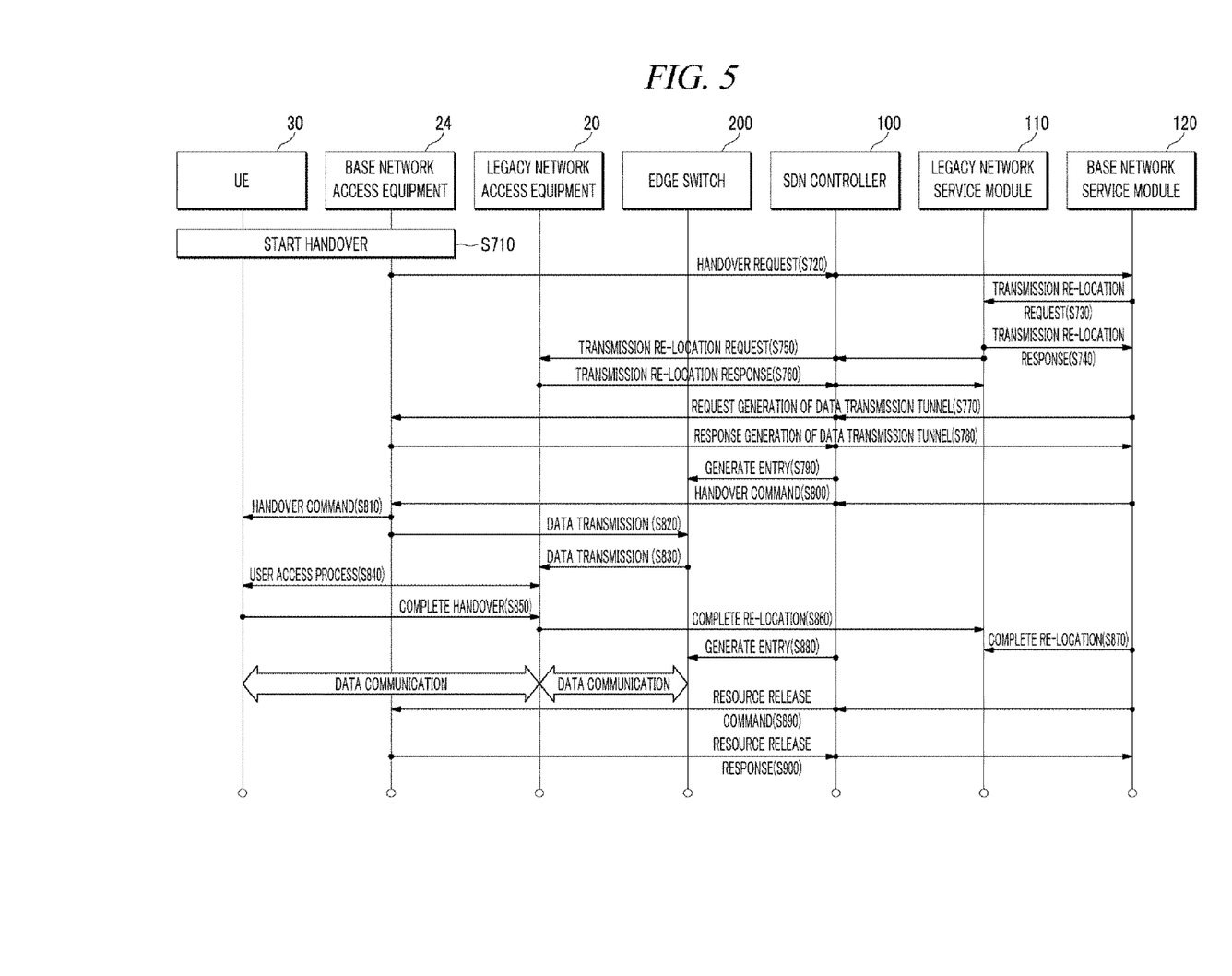
FIG. 5 is a flowchart provided to explain a data processing method for a handover between heterogeneous access equipment in a network system.

FIG. 5 is a flowchart provided to explain a data processing method for a handover between heterogeneous access equipment in a network system.

Firstly, if a signal intensity of the user equipment 30 connected to the base network access equipment 24 is equal to or less than a predetermined value, the base network access equipment 24 or the user equipment 30 may determine a handover of the user equipment 30.

Then, the base network access equipment 24 may start the handover of the user equipment 30 (S710).

If the handover of the user equipment 30 is started, the base network access equipment 24 transmits a handover request corresponding to the user equipment 30 to the SDN controller 100 (S720). In this case, the handover may be a change from an access path for connecting the user equipment 30 to the base network access equipment 24 to an access path for connecting the user equipment 30 to the legacy network access equipment 20.

The SDN controller 100 receiving the handover request from the base network access equipment 24 may transfer a re-location request to the legacy network access equipment 20 to be connected after the handover through the base network service module 120 and the legacy network service module 110 included in the SDN controller 100 (S730, S750).

Then, the SDN controller 100 may receive responses corresponding to the re-location request from the base network service module 120 and the legacy network service module 110 (S740, S760).

Further, the SDN controller 100 may generate a downlink data transmission tunnel between heterogeneous network access equipment in order to suppress the loss of downlink data of the user equipment 30 during the handover. To this end, the SDN controller 100 may transfer a transmission tunnel generation request to the base network access equipment (S770). Then, the SDN controller 100 may receive a response corresponding to the data transmission tunnel generation request from the base network access equipment 24 (S780).

In this case, the data transmission tunnel needs to be generated using the edge switch 200 as an anchor point. Further, the SDN controller 100 transfers an entry generation request to the edge switch 200 (S790).

The edge switch 200 generates an entry on the basis of the entry generation request. In this case, the edge switch 200 may generate an entry using information about an access path included in the entry generation request. For example, the information about an access path may include an IP address and GTP tunnel information for a session established for the base network by the base network service module 120 included in the SDN controller 100.

Through this process, the data transmission tunnel may connect the base network access equipment 24 and the legacy network access equipment 20 through the edge switch 200. Further, the base network access equipment 24 may transfer data to be transferred to the user equipment 30 without loss to the legacy network access equipment 20 during the handover from beginning to end. Further, the legacy network access equipment 20 may buffer the date received from the base network access equipment 24 until the handover of the user equipment 30 is completed.

Then, the SDN controller 100 may transfer a handover command to the base network access equipment 24 currently connected to the user equipment 30 through the base network service module 120 included in the SDN controller 100 (S800).

Then, the base network access equipment 24 may transfer the handover command received from the SDN controller 100 to the user equipment 30 (S810).

Herein, the base network access equipment 24 may transmit downlink data through the data transmission tunnel in order to perform the handover without loss (S820). That is, the base network access equipment 24 may transfer data to the legacy network access equipment 20 through the data transmission tunnel generated on the basis of the edge switch 200 (S830).

Then, the legacy network access equipment 20 may buffer the downlink data received from the base network access equipment 24 using the data transmission tunnel.

The user equipment 30 may perform a user access process with the legacy network access equipment 20 after the handover. (S840). Then, the user equipment 30 may transfer a handover complete signal to the legacy network access equipment 20 (S850).

The legacy network access equipment 20 may transfer a re-location complete signal to the legacy network service module 110 through the SDN controller (S860). Then, the legacy network service module 110 may transfer the re-location complete signal for communication to the base network service module 120 (S870).

Upon receipt of the handover complete signal, the SDN controller 100 may sense that the handover is completed. Then, the SDN controller 100 transfers an entry generation command to the edge switch 200 in order to modify an uplink data path for the user equipment (S880).

Accordingly, the edge switch 200 changes an entry in which an uplink data path is set to the base network access equipment 24 before the handover to an entry in which uplink data path is set to the legacy network access equipment 20 after the handover. Then, the edge switch 200 may modify the uplink data path on the basis of the entry generation command received from the SDN controller 100.

Further, the legacy network access equipment 20 may transfer data collected and buffered by the base network access equipment 24 during the handover to the user equipment 30.

Then, the user equipment 30 may perform data communication with the base network through the legacy network access equipment 20 and the edge switch 200.

Then, the SDN controller 100 may transfer a resource release command to the base network access equipment 24 before the handover (S890).

In response to the resource release command, the base network access equipment 24 releases the resource assigned to the user equipment 30. Then, the base network access equipment 24 may transfer a response corresponding to the resource release command to the SDN controller 100 (S900).

Depend on a data processing method for integrating and operating legacy network services with a 4G network or its next generation network to be developed on the basis of a software defined network in accordance with an exemplary solutions of the present disclosure, it is possible to accommodate legacy network services installed in the past and being operated in a currently-operating 4G or its next generation network in a software manner and thus operate them in one integrated network. Therefore, depend on the data processing method for integrating and operating legacy network services with a 4G network or its next generation network to be developed on the basis of a software defined network, costs for operating and managing a legacy network which has been used for providing the legacy network services can be reduced.

The exemplary solutions can be embodied in a storage medium including instruction codes executable by a computer or processor such as a program module executed by the computer or processor. A data structure in accordance with the exemplary solutions can be stored in the storage medium executable by the computer or processor. A computer-readable medium can be any usable medium which can be accessed by the computer and includes all volatile/non-volatile and removable/non-removable media. Further, the computer-readable medium may include all computer storage and communication media. The computer storage medium includes all volatile/non-volatile and removable/non-removable media embodied by a certain method or technology for storing information such as a computer-readable instruction code, a data structure, a program module or other data. The communication medium typically includes the computer-readable instruction code, the data structure, the program module, or other data of a modulated data signal such as a carrier wave, or other transmission mechanism, and includes information transmission mediums.

The system and method of the present disclosure has been explained in relation to a specific embodiment, but its components or a part or all of its operations can be embodied by using a computer system having general-purpose hardware architecture.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. A data processing method of a software defined network (SDN) controller included in a SDN, wherein the SDN controller is connected to legacy network access equipment, an edge switch, and base network access equipment, and includes:

(a) receiving an access request of a user equipment transmitted by the legacy network access equipment through the edge switch connected to the legacy network access equipment;

(b) setting initial access of the user equipment through a legacy network service module included in the SDN controller in response to the access request of the user equipment;

(c) generating an access path for a base network on the basis of a base network service module included in the SDN controller upon completion of the initial access setup; and (d) requesting the edge switch to generate an entry for the access path upon generation of the access path.

2. The data processing method of a SDN controller of claim 1,
wherein the SDN controller includes one or more of a virtualized packet switch support node (SGSN: serving GPRS support node), a virtualized packet gateway support node (GGSN: gateway GPRS support node), and a virtualized home location register (HLR), a virtualized dynamic host configuration protocol (DHCP) server, and a virtualized security module, as the legacy network service module.

3. The data processing method of a SDN controller of claim 1,
wherein the SDN controller includes one or more of a virtualized mobility management entity (MME), a virtualized home subscriber server (HSS), and a virtualized policy charging and rule function (PCRF), as the base network service module.

4. The data processing method of a SDN controller of claim 1,
wherein (b) the setting of initial access includes: transferring the access request of the user equipment to the legacy network service module by the SDN controller; performing a user authentication process, a security setup process, and a user location information update process by the legacy network service module; and receiving an access permission message of the user equipment from the legacy network service module upon completion of the user authentication process, the security setup process, and the user location information update process.

5. The data processing method of a SDN controller of claim 1,
wherein (c) the generating of an access path includes: transmitting an access request to the base network service module by the SDN controller; transmitting a session establishment request message to the base network by the base network service module; and receiving an IP address and GTP tunnel information for a session from the base network in response to the session establishment request.

6. The data processing method of a SDN controller of claim 5,
wherein (d) the requesting includes: transmitting an entry generation message including the IP address and GTP tunnel information to the edge switch by the SDN controller; and transmitting an access permission message to the legacy network access equipment through the SDN controller and the edge switch by the legacy network service module.

* * * * *